(12) United States Patent
Ludeman

(10) Patent No.: US 6,931,108 B2
(45) Date of Patent: Aug. 16, 2005

(54) INTEGRATED POTS/DSL LINE DRIVER WITH FLOATING SUPPLY VOLTAGE

(75) Inventor: Christopher Ludeman, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 185 days.

(21) Appl. No.: 10/390,229

(22) Filed: Mar. 17, 2003

(65) Prior Publication Data

US 2004/0184587 A1 Sep. 23, 2004

(51) Int. Cl.[7] .............................................. H04M 11/00
(52) U.S. Cl. ................................. 379/93.05; 379/413
(58) Field of Search ........................... 379/93.05, 93.06, 379/93.07, 93.36, 413

(56) References Cited

U.S. PATENT DOCUMENTS 6,597,768 B2 * 7/2003 Yamano et al. .......... 379/93.05
6,674,845 B2 * 1/2004 Ayoub et al. ............ 379/93.05

* cited by examiner

Primary Examiner—Stella Woo
(74) Attorney, Agent, or Firm—Allen, Dyer, Doppelt, Milbrath & Gilchrist, P.A.

(57) ABSTRACT

A telecommunication interface integrates DSL and POTS components in a manner which effectively separates their bandwidth requirements from their power requirements. This is accomplished by powering the tip path and ring path amplifiers with a pair of transformer-coupled floating power supply-sourced voltages, and referencing respective like polarity inputs of the amplifiers to a differential voltage pair that is used to operate the subscriber loop, including providing loop current and controllably applying a ringing voltage to the POTS line.

16 Claims, 3 Drawing Sheets

INTEGRATED POTS/DSL LINE DRIVER WITH FLOATING SUPPLY VOLTAGE

FIELD OF THE INVENTION

The present invention relates in general to telecommunication systems and circuits therefor, and is particularly directed to a power supply and signal interface arrangement that is configured to couple power to tip and ring path amplifiers for a subscriber line pair, in a manner that enables the amplifiers to simultaneously drive the line with both plain old telephone service (POTS) signals and digital subscriber line (DSL) signals.

BACKGROUND OF THE INVENTION

Telecommunication service providers are continually seeking ways to upgrade their operational capabilities without a substantial cost and/or power penalty to existing equipment infrastructures. In particular, service providers have sought ways to augment their legacy remote terminals (RTs) with digital data capability without impacting existing POTS equipment. A fundamental problem is the fact that the remote terminals were originally configured prior to the advent of DSL services, so that in many instances there is a housing space limitation as far as adding new circuits is concerned. Moreover, DSL service operates under a different set of parameters than does POTS and, in the case of remotely located equipment cabinets, requires a battery back-up package (for lifeline service) in the event of a local power outage.

One conventional architecture for providing both POTS and DSL service in a remote terminal is diagrammatically illustrated in FIG. 1, as comprising a POTS/DSL splitter 10 installed in the subscriber loop. The splitter serves to spectrally separate (as shown in the spectral diagram of FIG. 2) the relatively low frequency band used for POTS voice and ringing signals (on the order of four KHz) from an upper frequency band (on the order of from 25 KHz to 1.1 MHz) used for DSL signals. Customarily, the POTS line conveys a −48 VDC voltage differential for powering the POTS terminal equipment, and includes a ringing relay for ringing the telephone. A subscriber line interface circuit (SLIC) 20 interfaces the POTS channel with voice band equipment (codec), while DSL driver circuitry 30 interfaces the DSL channel with digital band terminal equipment. In order to isolate the lower voltage (+/−+12 VDC) used by the digital channel from the −48 VDC of the POTS line, the high pass port of the band splitter 10 is usually transformer-coupled with the DSL link, as shown at 40.

A fundamental shortcoming of the band-splitter approach of FIG. 1 is its size and complexity, which results from what is essentially a DSL add on. In addition to the fact that separate drivers are used for the POTS and DSL channels, the band splitter is usually a high order device (e.g., a sixth order filter), in order to achieve the required channel separation (65–70 dB). An alternative approach is to use a lower order filter (such as a second order filter); however, doing so requires careful design of the POTS line driver circuitry to accommodate signal leakage (shown in the spectral diagram of FIG. 3). This results from the lower order filter implementation.

Another proposal, diagrammatically illustrated in FIG. 4, is to construct a broadband ringing SLIC, that is capable of handling both DSL and POTS signaling simultaneously. A principal drawback to this architecture is the need to accommodate a multitude of requirements in a single design. To accommodate maximum distance POTS signaling, including ringing, balanced line signaling is required. Without transformer coupling, protection resistors must also be part of the circuit, and a significant portion of the DSL signal is lost across these components. Also, DC offset is used for detection of off-hook on long subscriber loops. When all of these requirements are taken into account, what results is a broadband circuit design that needs a line voltage on the order of −180 VDC. Thus, the circuit is complex, expensive and suffers from substantial power consumption.

SUMMARY OF THE INVENTION

In accordance with the present invention, these and other shortcomings of conventional, combined POTS and DSL interface architectures, such as those described above, are successfully addressed by an new and improved telecommunication interface that integrates DSL and POTS components in a manner that effectively separates their bandwidth requirements from their power requirements. As will be described, this is accomplished by powering the tip path and ring path amplifiers with a pair of floating voltages, and referencing respective like polarity inputs of the amplifiers to a differential voltage pair that is used to operate the subscriber loop (including providing loop current and controllably applying a ringing voltage to the POTS line).

To this end, the interface includes a pair of complementary polarity voice band input ports to which a differential voice signal, such as that provided by a voice band codec coupled to network equipment, is supplied. A ringing signal input port is coupled to receive a ringing control signal. In addition to these POTS associated inputs, a pair of complementary polarity DSL input ports are coupled to receive a differential DSL signal, such as that provided by a DSL codec coupled to the network equipment. A first polarity voice port and a first polarity DSL port are AC (e.g. capacitor or could also be inductively coupled through a transformer) coupled to a first summing node, which feeds the inverting input of a broadband tip path amplifier. In a complementary manner, a second polarity voice port and a second polarity DSL port are AC coupled to a second summing node, which feeds the inverting input of a broadband ring path amplifier.

A power supply continuously supplies a first voltage waveform to the primary winding of an amplifier-powering transformer. This transformer has first and second, center-tapped secondary windings. Opposite ends of the first secondary winding provide respective positive and negative power supply voltages for the tip path amplifier, while opposite ends of the second secondary winding provide respective positive and negative power supply voltages for the ring path amplifier. For each of the secondary windings, the primary to secondary turn ratios and winding polarities of the transformer are such that non-common ends of the secondary windings (as rectified and integrated by associated diode-capacitor pairs) provide equal and opposite polarity DC supply voltages (e.g., +/−12 VDC) for operating the circuitry of the tip and ring path amplifiers, and thereby enable the interface of the invention to fully drive the subscriber line pair with DSL signals.

In order to enable the tip and ring amplifiers to drive the subscriber line pair with POTS-based signals (e.g., voice and ringing), center taps of the secondary windings, to which non-inverting inputs of the amplifiers are coupled, are coupled to voltage output ports of the power supply. These outputs provide additional voltage signals that create a prescribed differential voltage across the subscriber line pair.

To handle non-DSL (POTS) signaling, the power supply produces a first negative voltage waveform (e.g. on the order of −4 V) at the output port feeding the non-inverting input of the tip path amplifier. In association with this tip path negative voltage, the power supply outputs a second negative voltage waveform (e.g. on the order of −44 V). This voltage is coupled to the non-inverting (+) input of the ring path amplifier. These two voltages (−4V and −44V) at the non-inverting (+) inputs of the tip and ring path amplifiers result in a net voltage on the order of +40 VDC (−4 v−(−44 v)) being developed at their outputs and therefore across the tip and ring conductors of the subscriber line pair. The +/−12 VDC for powering the tip path amplifier effectively 'rides' on the −4 VDC voltage, while the +/−12 VDC for powering the ring path amplifier effectively 'rides' on the −44 VDC voltage. The tip and ring path amplifiers for DSL signals are not affected by the subscriber loop powering voltages.

BRIEF DESCRIPTION OF THE DRAWINGS

FIG. 4 FIG. 1 diagrammatically illustrates another prior art architecture for providing POTS and DSL service in a remote terminal.

DETAILED DESCRIPTION

Figure 1:
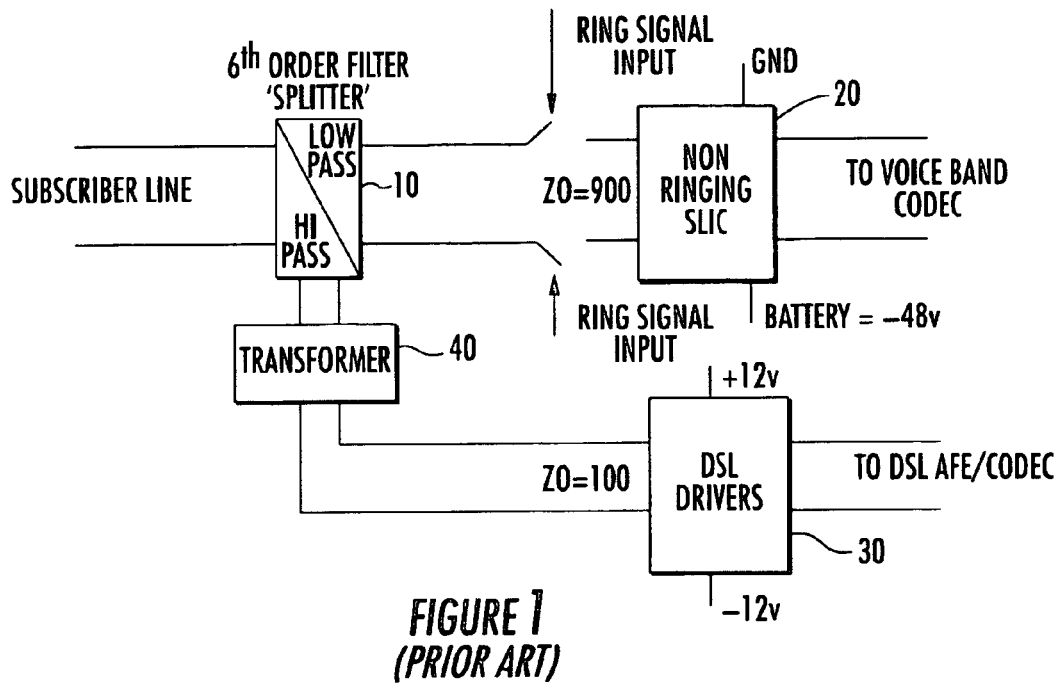
FIG. 1 diagrammatically illustrates one example of a conventional architecture for providing POTS and DSL service in a remote terminal.
Figure 2:
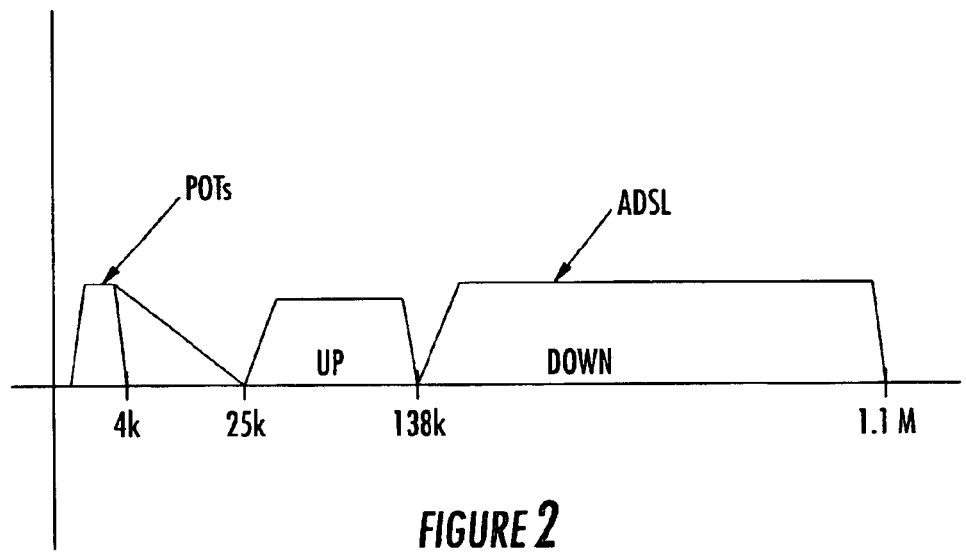
FIG. 2 is a spectral diagram associated with FIG. 1.
Figure 3:
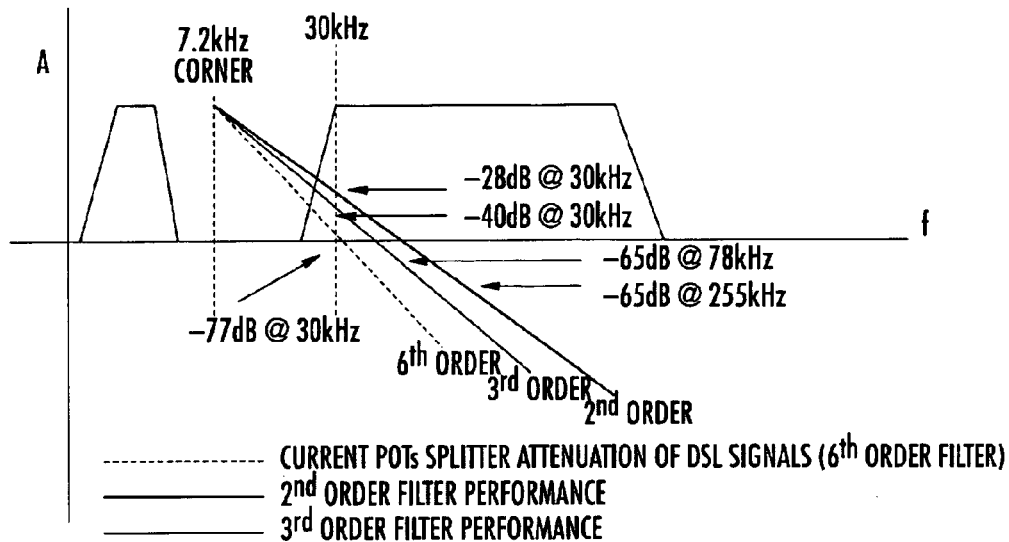
FIG. 3 is a spectral diagram showing the effect of a lower order filter in a DSL—POTS filtering application.
Figure 4:
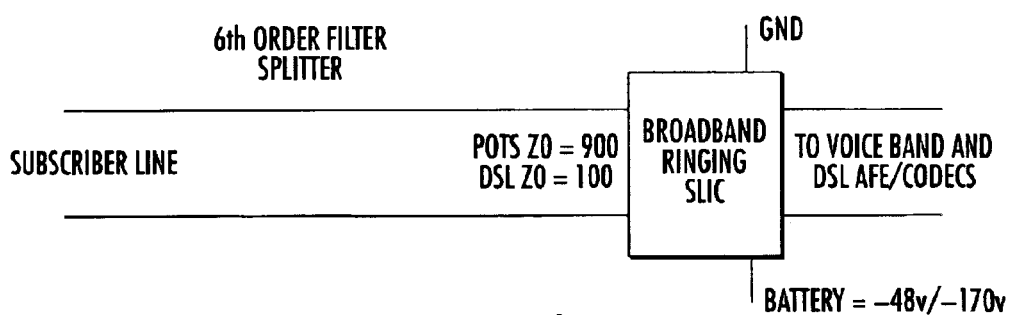

Before detailing the power supply and signal interface arrangement of the present invention, it should be observed that the invention resides primarily in a prescribed arrangement of conventional digital and analog circuits and components. As a consequence, the configuration of such circuits and components have, for the most part, been depicted in the drawings by readily understandable block diagrams which show only those specific details that are pertinent to the present invention, so as not to obscure the disclosure with details which will be readily apparent to those skilled in the art having the benefit of the description herein. Thus, the block diagrams of the Figures are primarily intended to show the major components of the invention in convenient functional groupings, whereby the present invention may be more readily understood.

Figure 5:
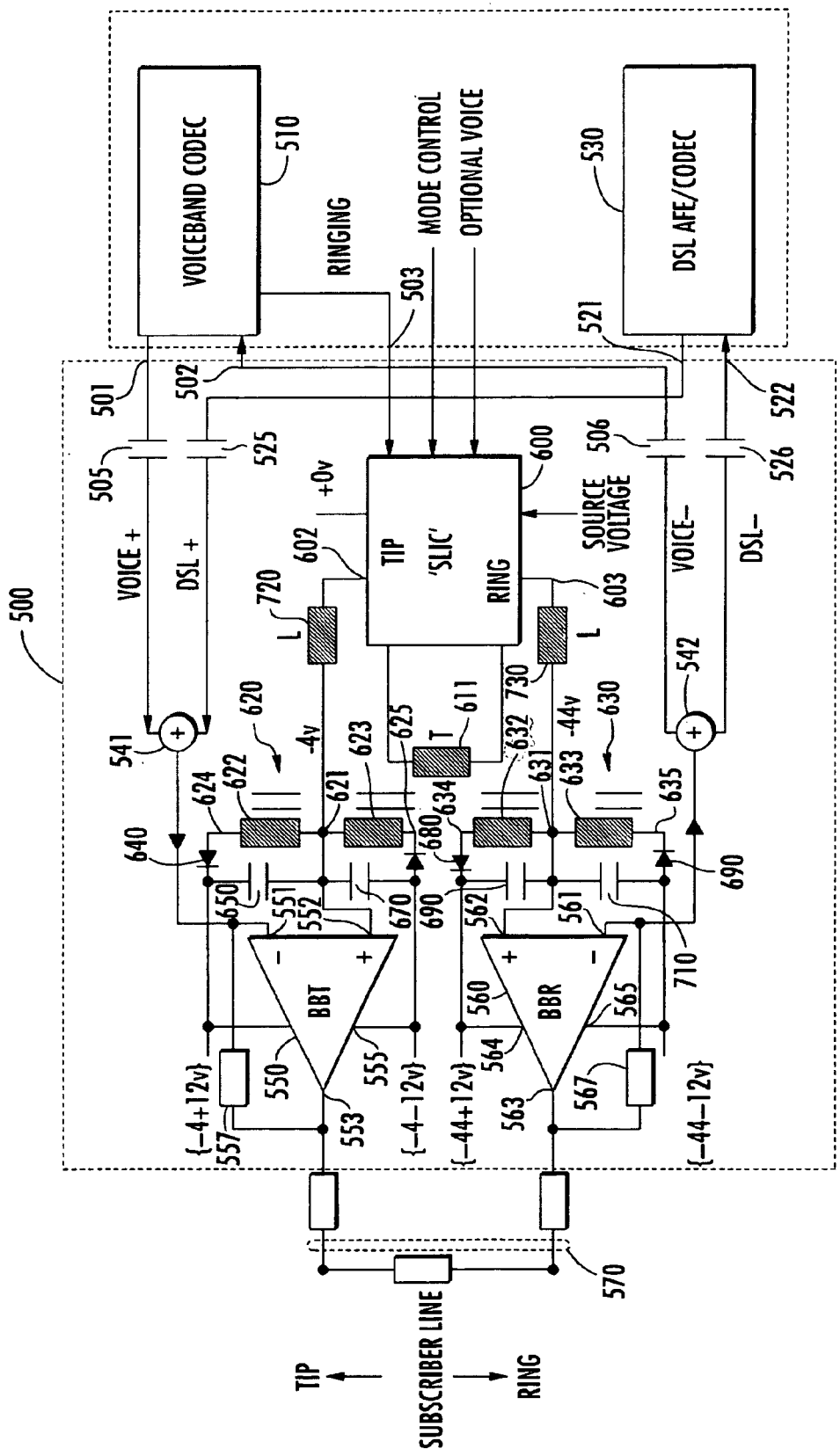
FIG. 5 diagrammatically illustrates an embodiment of the power supply and signal interface according to present invention.

Attention is now directed to FIG. 5, which diagrammatically illustrates an embodiment of the power supply and signal interface according to present invention. As shown therein, the interface, surrounded by broken lines 500, includes complementary polarity voice band input ports 501 and 502, to which a differential voice signal, such as that provided by a voice band codec 510 coupled to network equipment, is supplied. A further voice band input port 503 is coupled to receive a ringing control signal from the voice band codec. This ringing control signal is supplied to a ringing voltage control input of a power supply, in response to which the supply outputs a balanced or unbalanced ringing voltage signal through respective tip and ring path amplifiers. Interface 500 further includes a pair of complementary polarity DSL input ports 521 and 522, to which a differential DSL signal, such as that provided by a DSL codec 530 coupled to the network equipment, is supplied.

Input ports 501 and 521 are capacitor-coupled (at 505 and 525) to a summing node 541, which feeds a first, inverting (−) input 551 of a broadband tip path amplifier 550. A feedback resistor 557 is coupled between the output 553 and inverting input 551 of the tip path amplifier. In a complementary fashion, input ports 502 and 522 are capacitor-coupled (at 506 and 526) to a summing node 542, which feeds a first, inverting (−) input 561 of a broadband ring path amplifier 560. A feedback resistor 567 is coupled between output 563 and inverting input 561 of the ring path amplifier. Tip path amplifier 550 has its output 553 coupled to the tip side of a subscriber line pair 570, while ring amplifier 560 has its output 563 coupled to the ring side of the subscriber line pair 570.

As pointed out above, the POTS/DSL interface of the invention integrates DSL and POTS components in a manner that effectively separates their bandwidth and power requirements. This is accomplished by powering the tip path and ring path amplifiers with a pair of floating voltages, and referencing respective like inputs of the amplifiers to a differential voltage pair that is used to operate the subscriber loop (including providing loop current and controllably applying a ringing voltage to the POTS line). A voltage generator unit 600 provides DC voltages and ringing voltages used for various POTS signaling. Voltage generator 600 is of conventional construction and may contain controllably operated step-up and step-down DC-DC converter circuits referenced to a pair of voltage source inputs (V− and ground GND)).

During on-hook mode of the subscriber device, the voltage generator unit outputs a 40 vdc differential voltage on its Tip and Ring output port, and applies a first voltage waveform to the primary winding 611 of an output transformer 610, so that the tip and ring amplifiers are powered by +/−12V riding on a +40 v dc supply voltage, and driven by the DSL signal into an AC line impedance on the order of 110 ohms. Since there is usually only an ac load present in the on-hook condition, almost all of the current supplied to the subscriber line is sourced by the +/−12 v supplies. During off-hook mode, voltage generator unit 600 applies a voltage differential between its Tip and Ring ports which may be between 40 v and zero depending upon the dc load terminating the line, so that there is DC current flowing into the line (assuming the subscriber is off-hook for a POTS call). The DSL signal will modulate this current, but if the DSL peak current in the subscriber line is larger than the POTS DC current, the remainder of the current is derived from +/−12V. The output voltages provided by the voltage generator unit have a low impedance in the range of frequencies used for both POTS and DSL signaling.

To this end, transformer 610 has first and second, center-tapped secondary windings 620 and 630, respectively. The first secondary winding 620 has a center tap 621, that is common to a pair of secondary coils 622 and 623. This secondary winding center tap 621 is coupled to a second, non-inverting (+) input 552 of tip path amplifier 550. A non-common end 624 of secondary coil 622 is coupled through a diode 640 to one side of a capacitor 650, a second side of which is coupled to the non-inverting input 552 of the tip path amplifier 550. Similarly, a non-common end 625 of secondary coil 623 is coupled through a diode 660 to one side of a capacitor 670, a second side of which is coupled to the non-inverting input 552 of the path amplifier 550.

The common connection 645 of diode 640 and capacitor 650 is coupled to a first, positive polarity voltage supply input 554 of tip amplifier 550, while the common connection 665 of diode 660 and capacitor 670 is coupled to a second, negative polarity voltage supply input 555 of the tip path amplifier 550. The primary to secondary turn ratios and winding polarities of the power supply output transformer 610 are such that the non-common ends 624 and 625 of respective secondary windings 622 and 623 (as rectified and integrated by their associated diode-capacitor pair) provide equal and opposite polarity supply voltages (e.g., +12 VDC and −12 VDC) for operating the circuitry of the tip path amplifier 550.

In a like manner, on the ring path amplifier side, secondary winding 630 has a center tap 631, that is common to a pair of secondary coils 632 and 633 of the secondary winding. Center tap 631 is coupled a second, non-inverting (+) input 562 of the ring path amplifier 560. A non-common end 634 of the secondary coil 632 is coupled through a diode 680 to one side of a capacitor 690, a second side of which is coupled to the non-inverting input 652 of ring path amplifier 560. Similarly, a non-common end 635 of secondary coil 633 is coupled through a diode 690 to one side of a capacitor 710, a second side of which is coupled to the non-inverting input 562 of the tip path amplifier 560.

The common connection 685 of diode 680 and capacitor 690 is coupled to a first, positive polarity voltage supply input 564 of ring path amplifier 560, while the common connection 695 of diode 690 and capacitor 710 is coupled to a second, negative polarity voltage supply input 565 of ring path amplifier 560. As is the case with the tip path amplifier, the primary to secondary turn ratios and winding polarities of transformer 610 relative to the secondary winding 630 are such that the non-common ends 634 and 635 of respective secondary windings 632 and 633 (as rectified and integrated by their associated diode-capacitor pair) provide equal and opposite polarity supply voltages (e.g., +12 VDC and −12 VDC) for operating the circuitry of the ring path amplifier 560.

The circuitry connections described thus far enable the interface to fully drive the tip and ring sides of the subscriber line pair with DSL signals. As pointed out above, voltages developed across the secondary windings 620 and 630 are effectively floating with respect to the voltage applied to the primary winding 611 of transformer 610. By referencing their center taps to the non-inverting input terminals of the amplifiers, the rectified and capacitor integrated voltages produced from the opposite ends of the secondary windings provide prescribed power rail DC voltages (e.g., +/−12 VDC) for operation of both tip and ring path amplifiers.

In order to enable the tip and ring amplifiers to drive the subscriber line pair with POTS-based signals (e.g., voice and ringing), the center taps of the secondary windings, to which the non-inverting inputs of the amplifiers are coupled, are coupled (through respective filtering inductors 720 and 730) to voltage output ports 602 and 603 of power supply 600. These output ports provide additional voltage signals that are used to create a prescribed differential voltage across the subscriber line pair. To handle non-DSL (e.g., POTS) signaling, power supply 600 outputs a first negative voltage waveform (e.g. on the order of −4 V) at output port 602. This voltage is coupled through inductor 720 to the non-inverting (+) input 552 of tip path amplifier 550. In association with this tip path negative voltage, power supply 600 outputs a second negative voltage waveform (e.g. on the order of −44 V) at output port 603. This voltage is coupled through inductor 730 to the non-inverting (+) input 562 of ring path amplifier 560.

This voltage differential (−4V−(−44V)) applied between the non-inverting (+) inputs of each of the tip and ring path amplifiers results in a net voltage on the order of +40 VDC being developed at the outputs of the tip and ring path amplifiers, and therefore across the tip and ring conductors of the subscriber line pair. Since inductors 720 and 730, through which respective voltages are coupled to the tip and ring path amplifiers, are connected to the center taps of the secondary windings 620 and 630 of transformer 610, it can be seen that the +/−12 VDC for powering the tip path amplifier 550 effectively 'rides' on the −4 VDC voltage supplied through inductor 720, while the +/−12 VDC for powering the ring path amplifier 560 effectively 'rides' or 'floats' on the −44 VDC voltage supplied through inductor 730.

Thus, the operations of the tip and ring path amplifiers for DSL signals are not affected by the subscriber loop powering voltages. Because of the floating configuration of the secondary windings of the power supply's output transformer 610, this effect is true for any voltages (such as a ringing voltage) produced by power supply 600 at ports 602 and 603. A balanced or unbalanced ringing voltage may be generated by dedicated step-up DC-DC voltage conversion circuitry within the power supply 600, in accordance with a ringing control signal applied to ringing control port 503, as referenced above. Again, since this voltage is coupled to the center taps of the secondary windings of the supply transformer, which are coupled to the non-inverting inputs of the tip and ring path amplifiers, the ringing signal has no impact on any DSL signals with which the subscriber loop is being driven by the amplifier pair.

As will be appreciated from the foregoing description, the above-discussed shortcomings of conventional, combined POTS and DSL interface architectures are effectively obviated by the interface of the present invention, which integrates DSL and POTS components in a manner that effectively separates their bandwidth requirements from their power requirements. This is accomplished by powering the tip path and ring path amplifiers with a pair of floating voltages, and referencing respective like polarity inputs of the amplifiers to a differential voltage pair that is used to operate the subscriber loop.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. An apparatus for interfacing digital and voice band telecommunication signals and operational circuit voltages with a subscriber line pair comprising:

tip and ring path amplifier circuits, having inputs thereof coupled to receive voice and digital subscriber line signals, and having outputs thereof respectively coupled to tip and ring lines of said subscriber line pair; and a power supply interface, which is operative to power said tip path and ring path amplifiers with a pair of transformer-coupled floating power supply-sourced voltages, and to reference respective like polarity inputs of said tip and ring amplifiers to a differential voltage pair that operates said subscriber line pair.

2. The apparatus according to claim 1, wherein said power supply interface includes a power supply circuit that is operative couple a first voltage to an input of said tip path amplifier and to supply a second voltage, different from said first voltage, to an input of said ring path amplifier, so that a voltage that is proportional to a difference between said first and second voltages is applied from outputs of said tip and ring path amplifiers across said tip and ring lines of said subscriber line pair, and wherein said power supply circuit is further operative to supply a voltage for operating said tip and ring path amplifiers that floats with respect to each of said first and second voltages.

3. The apparatus according to claim 2, wherein said first and second voltages have a difference voltage therebetween on the order of +40 VDC.

4. The apparatus according to claim 2, wherein said power supply is operative to provide said first and second voltages as a ringing signal voltage.

5. The apparatus according to claim 2, wherein said power supply circuit has a first output coupled to a primary winding of a transformer, said transformer including a first secondary winding having a center tap coupled to an input of said tip path amplifier circuit, and separate nodes thereof coupled to respective power supply terminals of said tip amplifier and providing voltages for operating said tip path amplifier, and a second secondary winding having a center tap coupled to an input of said ring path amplifier circuit, and separate nodes thereof coupled to respective power supply terminals of said ring amplifier and providing voltages for operating said ring path amplifier.

6. The apparatus according to claim 5, further including complementary polarity voice band input ports to which a differential voice signal is supplied and complementary polarity DSL input ports to which a differential DSL signal is supplied, and wherein a first polarity voice port and a first polarity DSL port are coupled via a first summing node to an inverting input of said tip path amplifier circuit, and wherein a second polarity voice port and a second polarity DSL port are coupled via a second summing node to an inverting input of said ring path amplifier circuit, and said first secondary winding has its center tap coupled to a non-inverting input of said tip path amplifier, and said second secondary winding has it's center tap coupled to a non-inverting input of said ring path amplifier.

7. A method for interfacing digital and voice band telecommunication signals and operational circuit voltages with a subscriber line pair comprising the steps of:

(a) coupling voice and digital subscriber line signals to inputs of tip and ring path amplifier circuits, outputs of which are respectively coupled to tip and ring lines of said subscriber line pair;

(b) applying a first voltage to an input of said tip path amplifier;

(c) applying a second voltage, different from said first voltage, to an input of said ring path amplifier, so that a voltage proportional to a difference between said first and second voltages is coupled from outputs of said tip and ring path amplifiers across said tip and ring lines of said subscriber line pair; and (d) coupling to said tip and ring path amplifiers a power supply voltage that floats with respect to each of said first and second voltages.

8. The method according to claim 7, wherein step (d) comprises (d1) applying a power supply voltage to a primary winding of a transformer, (d2) providing a first secondary winding having a center tap coupled to an input of said tip path amplifier circuit, and separate nodes thereof coupled to respective power supply terminals of said tip amplifier, so as to provide voltages for operating said tip path amplifier, and (d3) providing a second secondary winding having a center tap coupled to an input of said ring path amplifier circuit, and separate nodes thereof coupled to respective power supply terminals of said ring amplifier, so as to provide voltages for operating said ring path amplifier.

9. The method according to claim 7, wherein said first and second voltages have a difference voltage therebetween on the order of +40 VDC.

10. The method according to claim 7, wherein said first and second voltages correspond to a ringing signal voltage.

11. An apparatus for interfacing digital and voice band telecommunication signals and operational circuit voltages with a subscriber line pair comprising:

tip and ring path amplifier circuits, coupled to receive both voice and digital subscriber line signals, and having outputs thereof respectively coupled to tip and ring lines of said subscriber line pair; and a voltage interface that is configured to power said tip path and ring path amplifiers with a first pair of voltages for DSL signaling, and to supply said tip and ring amplifiers with a differential voltage pair, different from said first pair of voltages, powers said subscriber line pair for POTS signaling, and wherein said voltage interface is configured to power said tip path and ring path amplifiers with a pair of transformer-coupled floating power supply-sourced voltages, and to reference respective like polarity inputs of said tip and ring amplifiers to a differential voltage pair that operates said subscriber line pair.

12. The apparatus according to claim 11, wherein said voltage interface includes a power supply circuit that is operative couple a first voltage to an input of said tip path amplifier and to supply a second voltage, different from said first voltage, to an input of said ring path amplifier, so that a voltage that is proportional to a difference between said first and second voltages is applied from outputs of said tip and ring path amplifiers across said tip and ring lines of said subscriber line pair, and wherein said power supply circuit is further operative to supply a voltage for operating said tip and ring path amplifiers that floats with respect to each of said first and second voltages.

13. The apparatus according to claim 12, wherein said power supply circuit has a first output coupled to a primary winding of a transformer, said transformer including a first secondary winding having a center tap coupled to said second polarity input of said tip path amplifier circuit, and separate nodes thereof coupled to respective power supply terminals of said tip amplifier and providing voltages for operating said tip path amplifier, and a second secondary winding having a center tap coupled to said second polarity input of said ring path amplifier circuit, and separate nodes thereof coupled to respective power supply terminals of said ring amplifier and providing voltages for operating said ring path amplifier.

14. The apparatus according to claim 13, further including complementary polarity voice band input ports to which a differential voice signal is supplied and complementary polarity DSL input ports to which a differential DSL signal is supplied, and wherein a first polarity voice port and a first polarity DSL port are coupled via a first summing node to an inverting input of said tip path amplifier circuit, and wherein a second polarity voice port and a second polarity DSL port are coupled via a second summing node to an inverting input of said ring path amplifier circuit, and said first secondary winding has its center tap coupled to a non-inverting input of said tip path amplifier, and said second secondary winding has is center tap coupled to a non-inverting input of said ring path amplifier.

15. The apparatus according to claim 13, wherein said first and second voltages have a difference voltage therebetween on the order of +40 VDC.

16. The apparatus according to claim 13, wherein said power supply is operative to provide said first and second voltages as a ringing signal voltage.

\* \* \* \* \*